US009436977B2

(12) United States Patent
Hu et al.

(10) Patent No.: US 9,436,977 B2
(45) Date of Patent: Sep. 6, 2016

(54) GRAYSCALE COMPENSATION METHOD AND SYSTEM FOR DEFECT ON DISPLAY PANEL

(71) Applicant: Shenzhen China Star Optoelectronics Technology Co., Ltd., Shenzhen, Guangdong (CN)

(72) Inventors: Houliang Hu, Guangdong (CN); Ping-sheng Kuo, Guangdong (CN); Li-wei Chu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 85 days.

(21) Appl. No.: 14/425,042

(22) PCT Filed: Jan. 14, 2015

(86) PCT No.: PCT/CN2015/070695
§ 371 (c)(1),
(2) Date: Mar. 1, 2015

(87) PCT Pub. No.: WO2016/106852
PCT Pub. Date: Jul. 7, 2016

(65) Prior Publication Data
US 2016/0189347 A1 Jun. 30, 2016

(30) Foreign Application Priority Data
Dec. 29, 2014 (CN) .......................... 2014 1 0834528

(51) Int. Cl.
*G09G 5/02* (2006.01)
*G06T 5/00* (2006.01)

(52) U.S. Cl.
CPC ....... *G06T 5/00* (2013.01); *G06T 2207/20172* (2013.01)

(58) Field of Classification Search
None
See application file for complete search history.

(56) References Cited

U.S. PATENT DOCUMENTS

| 2002/0176024 | A1* | 11/2002 | Kao | H04N 5/202 348/674 |
|---|---|---|---|---|
| 2010/0053204 | A1* | 3/2010 | Hwang | G09G 3/3648 345/618 |
| 2010/0141559 | A1* | 6/2010 | Hwang | G09G 5/003 345/58 |
| 2014/0184671 | A1* | 7/2014 | Lee | G09G 3/006 345/697 |

* cited by examiner

*Primary Examiner* — Kee M Tung
*Assistant Examiner* — Frank Chen
(74) *Attorney, Agent, or Firm* — Andrew C. Cheng

(57) ABSTRACT

A method of grayscale compensation to defects on a display panel includes: (A) obtaining a set of coordination of the defect on the display panel, and determining a defect area where the defect locates based on the set of coordination; (B) obtaining a gamma curve of the defect, a gamma curve of a background of the defect area, and a standard gamma curve of the background of the display panel; (C) obtaining a standard gamma curve of the defect and a standard gamma curve of the background of the defect area; and (D) calculating a grayscale-compensation value for each grayscale of the defect, based on the standard gamma curve and the standard gamma curve of the background of the defect area. The present invention is to reduce calculation, and to achieve the best compensation to defects on a display panel.

9 Claims, 1 Drawing Sheet

GRAYSCALE COMPENSATION METHOD AND SYSTEM FOR DEFECT ON DISPLAY PANEL

BACKGROUND OF THE INVENTION

1. Field of the Invention

The present invention relates to manufacturing field of display panel, more particularly, to a method for grayscale compensation to defects on a display panel and a grayscale compensation system.

2. Description of the Prior Art

With fast developments in field of display panel, such display panels performing high-quality images as liquid crystal display panels or organic light display panels have been mainstream products in markets. In current manufacturing field of display panel, procedural or material insufficiency causes to defects in spot, line, stripe and block forms on a display panel, which is very difficult to completely avoid.

Some defects, like compensable defects, can be cured by altering external circuit voltage, or by changing amounts of digital grayscale, making the compensable defects perform as almost equal to normal areas. However, it is much larger for calculation by current method for grayscale compensation to defects of display panel. The same method is unable to achieve the best compensation to the defect.

SUMMARY OF THE INVENTION

According to the present invention, a method of grayscale compensation to defects on a display panel comprises: (A) obtaining a set of coordination of the defect on the display panel, and determining a defect area where the defect locates based on the set of coordination; (B) obtaining a gamma curve of the defect, a gamma curve of a background of the defect area, and a standard gamma curve of the background of the display panel; (C) obtaining a standard gamma curve of the defect and a standard gamma curve of the background of the defect area, based on the gamma curve of the defect, the gamma curve of the background of the defect area, and the standard gamma curve of the background of the display panel; and (D) calculating a grayscale-compensation value for each grayscale of the defect, based on the standard gamma curve and the standard gamma curve of the background of the defect area.

In one aspect of the present invention, the step (C) of obtaining a standard gamma curve of the defect and a standard gamma curve of the background of the defect area comprises: obtaining a first mapping curve of a brightness value of the defect and a brightness value of the background of the display panel, and a second mapping curve of a brightness value of the background of the defect area and the brightness value of the background of the display panel, based on the gamma curve of the defect, the gamma curve of the background of the defect area, and the standard gamma curve of the background of the display panel; and obtaining the standard gamma curve of the defect and the standard gamma curve of the background of the defect area by the first mapping curve and the second mapping curve.

In another aspect of the present invention, before step (D), the method further comprises: determining if the defect is a compensable defect. In case that the defect as a compensable defect, performing step (D).

In still another aspect of the present invention, a step of determining if the defect is a compensable defect comprises: determining the defect as a compensable defect, if a brightness value corresponding to a maximum grayscale of the standard gamma curve of the defect and a minimum grayscale of the standard gamma curve of the defect meet Equation 1

$$\frac{X(\max) - X(\min)}{\max + 1} \geq T, \quad \text{Equation 1}$$

where max denotes to the maximum grayscale of the standard gamma curve of the defect, min to the minimum grayscale of the standard gamma curve of the defect, X(max) to the brightness value corresponding to the maximum grayscale, X(min) to the brightness value corresponding to the minimum grayscale, and T to a predetermined threshold.

In yet another aspect of the present invention, the step (D) of calculating the grayscale compensation value of each grayscale based on the standard gamma curve of the defect and the standard gamma curve of the background of the defect area, is performed by Equation 2

$$\Delta\text{gray} = \text{gray2}(L) - \text{gray1}(L), \quad \text{Equation 2:}$$

where gray1(L) denotes to a grayscale of the defect obtained at a particular brightness value L based on the standard gamma curve of the defect, gray2(L) to a grayscale of the background of the defect area obtained at the particular brightness value L based on the standard gamma curve of the background of the defect area, and Δgray to a grayscale compensation value of the grayscale gray1(L) of the defect.

According to the present invention, a grayscale compensation system for a defect on a display panel comprises: a location detector, configured to obtain a set of coordination of the defect on the display panel, and to determine a defect area where the defect locates based on the set of coordination; a gamma-curve detector, configured to obtain a gamma curve of the defect, a gamma curve of a background of the defect area, and a standard gamma curve of the background of the display panel; a standard-gamma-curve detector, configured to obtain a standard gamma curve of the defect and a standard gamma curve of the background of the defect area, based on the gamma curve of the defect, the gamma curve of the background of the defect area, and the standard gamma curve of the background of the display panel; and a calculator, configured to calculate a grayscale-compensation value for each grayscale of the defect, based on the standard gamma curve and the standard gamma curve of the background of the defect area.

In one aspect of the present invention, the standard-gamma-curve detector is further configured to obtain a first mapping curve of a brightness value of the defect and a brightness value of the background of the display panel, and a second mapping curve of a brightness value of the background of the defect area and the brightness value of the background of the display panel, based on the gamma curve of the defect, the gamma curve of the background of the defect area, and the standard gamma curve of the background of the display panel; and to obtain the standard gamma curve of the defect and the standard gamma curve of the background of the defect area by the first mapping curve and the second mapping curve.

In another aspect of the present invention, the grayscale compensation system further comprises: a compensable-defect detector, configured to determine if the defect is a compensable defect. In case that the compensable-defect detector determines the defect as a compensable defect, the calculator calculates out the grayscale-compensation value for each grayscale of the compensable defect based on the standard gamma curve of the compensable defect and the standard gamma curve of the background of the defect area wherein the compensable defect located.

In still another aspect of the present invention, the compensable-defect detector further configured to determine the defect as a compensable defect if a brightness value corresponding to a maximum grayscale of the standard gamma curve of the defect and a minimum grayscale of the standard gamma curve of the defect meet Equation 1

$$\frac{X(\max) - X(\min)}{\max + 1} \geq T, \quad \text{Equation 1}$$

where max denotes to the maximum grayscale of the standard gamma curve of the defect, min to the minimum grayscale of the standard gamma curve of the defect, X(max) to the brightness value corresponding to the maximum grayscale, X(min) to the brightness value corresponding to the minimum grayscale, and T to a predetermined threshold.

In yet another aspect of the present invention, the calculator further configured to calculate out the grayscale compensation value of each grayscale, based on the standard gamma curve of the defect and the standard gamma curve of the background of the defect area, by Equation 2

$$\Delta\text{gray} = \text{gray2}(L) - \text{gray1}(L), \quad \text{Equation 2:}$$

where gray1(L) denotes to a grayscale of the defect obtained at a particular brightness value L based on the standard gamma curve of the defect, gray2(L) to a grayscale of the background of the defect area obtained at the particular brightness value L based on the standard gamma curve of the background of the defect area, and Δgray to a grayscale compensation value of the grayscale gray1(L) of the defect.

The object of the present invention is to substantially reduce calculation, and to achieve the best compensation to defects on a display panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

To be explained, the display panel illustrated in the preferred embodiment can be a liquid crystal display panel or an organic light emitting display panel.

Figure 1:
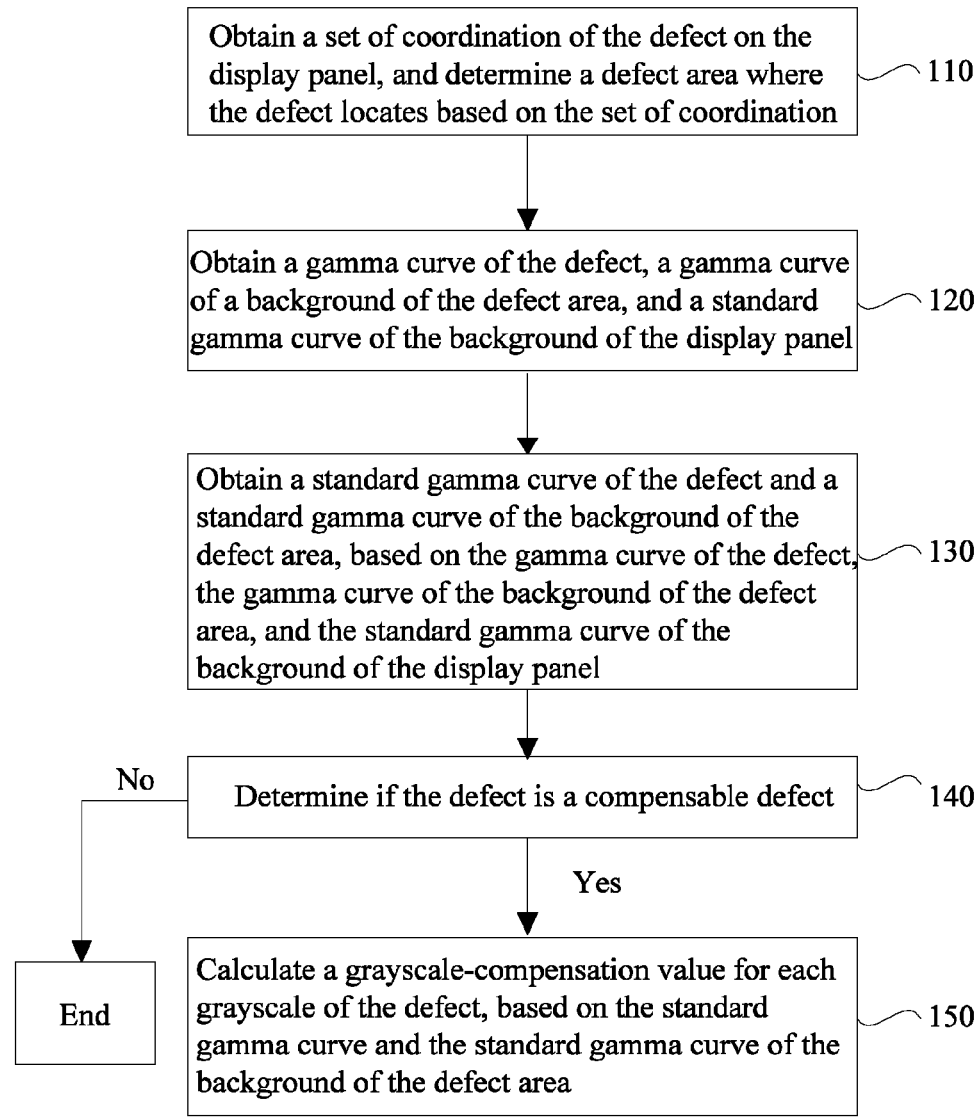
FIG. 1 depicts a flow chart of a method for grayscale compensation to a defect on a display panel according to a preferred embodiment of the present invention.

FIG. 1 depicts a flow chart of a method for grayscale compensation to a defect on a display panel according to a preferred embodiment of the present invention.

Referring to FIG. 1, at Step 110, it is to obtain a set of coordination of a defect on a display panel, and to locate a defect area where the defect locates based on a coordination of the defect. The method for obtaining the coordination of the defect on the display panel is: obtaining a brightness value of the defect on the display panel and the brightness value of the background of the display panel, obtaining the coordination of the defect on the display panel based on the brightness value of the defect on the display panel and the brightness value of the background of the display panel; where the brightness value of the background of the display panel refers to a brightness value of a normal area in the display panel, that is the non-defect area.

At Step 120, it is to obtain a gamma curve of the defect, a gamma curve of the defect area, and a standard gamma curve of the display panel. The gamma curve of the defect can be obtained by a brightness value of each grayscale. The grayscale according to the preferred embodiment is from 0 to 255, 256 grayscales in total. The gamma curve of the defect area can be obtained by a brightness value of the background of the defect area at each grayscale. The brightness value of the background of the defect area refers to a brightness value of an area in rest of the defect within the defect area. The standard gamma curve of the display panel can be obtained from the brightness value of the background of the display panel measured by a standard optical measurement device (e.g. CA 310) at each grayscale.

At Step 130, it is to obtain a standard gamma curve of the defect and a standard gamma curve of the background of the defect area based on the gamma curve of the defect, the gamma curve of the background of the defect area and the standard gamma curve of the background of the display panel.

A particular method for obtaining the standard gamma curve of the defect and the standard gamma curve of the background of the defect area comprises:

To obtain a brightness value of the defect and a first mapping curve of the brightness value of the background of the display panel, and a brightness value of the background of the defect area and a second mapping curve of the brightness value of the background of the display panel based on the gamma curve of the defect, the gamma curve of the background of the defect area, and the standard gamma curve of the background of the display panel; and to obtain a standard gamma curve of the defect and a standard gamma curve of the background of the defect area by the first mapping curve and the second mapping curve.

At Step 140, it is to categorize types of the defect, for determining if the defect is a compensable defect. The method for determining if the defect is a compensable defect is that when a brightness value corresponding to a maximum grayscale of the defect and a brightness value corresponding to a minimum grayscale of the defect meet Equation 1, the defect is determined as a compensable defect.

$$\frac{X(\max) - X(\min)}{\max + 1} \geq T, \quad \text{Equation 1}$$

where max denotes to the maximum grayscale of the standard gamma curve of the defect, min to the minimum grayscale of the standard gamma curve of the defect, X(max) to the brightness value corresponding to the maximum grayscale, X(min) to the brightness value corresponding to the minimum grayscale, and T to a predetermined threshold.

Or if the standard gamma curve of the defect constitutes in crest or trough, the defect is determined as a compensable defect.

If the defect is determined as a compensable defect, then go to Step 150; if the defect is a non-compensable defect, then go to END.

At Step 150, it is to calculate a grayscale compensation value of each grayscale of the defect based on the standard gamma curve of the defect and the standard gamma curve of the background of the defect area. The grayscale compensation value of each grayscale is calculated based on the standard gamma curve of the defect and the standard gamma curve of the background of the defect area, by Equation 2

$$\Delta\text{gray} = \text{gray2}(L) - \text{gray1}(L), \text{ where} \qquad \text{Equation 2:}$$

gray1(L) denotes to a grayscale of the defect obtained at a particular brightness value L based on the standard gamma curve of the defect, gray2(L) to a grayscale of the background of the defect area obtained at the particular brightness value L based on the standard gamma curve of the background of the defect area, and Δgray to a grayscale compensation value of the grayscale gray1(L) of the defect.

Moreover, it is to be noted that Step 140 is for further reducing amount of calculation according to the grayscale compensation method for the defect on the display panel according to the embodiment so as to alter calculation efficiency. It is also to be understood that the grayscale compensation method according to the embodiment can skip Step 140.

Figure 2:
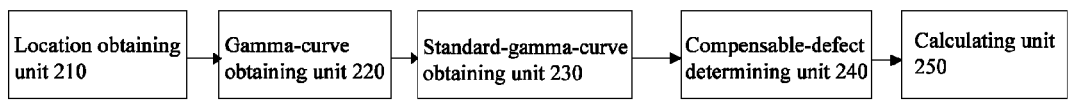
FIG. 2 depicts a block diagram of the grayscale compensation system for the defect on the display panel according to another preferred embodiment of the present invention.

FIG. 2 depicts a block diagram of the grayscale compensation system for the defect on the display panel according to another preferred embodiment of the present invention.

Referring to FIG. 2, the grayscale compensation system comprises: a location detector 210, a gamma-curve detector 220, a standard-gamma-curve detector 230, a compensable-defect detector 240, and a calculator 250.

In particular, the location detector 210 is configured to obtain the set of coordination of the defect on the display panel, and to determine the defect area where the defect locates based on the set of coordination. In more detail, the location detector 210 obtains the brightness value of the defect of the display panel and the brightness value of the background of the display panel, and then obtains the location coordinates of the defect on the display panel based on the brightness value of the defect of the display panel and the brightness value of the background of the display panel; where the brightness value of the background of the display panel refers to the brightness value of the normal area in the display panel, that is the non-defect area.

The gamma-curve detector 220 is configured to obtain the gamma curve of the defect, the gamma curve of the background of the defect area, and the standard gamma curve of the background of the display panel. In more detail, the gamma-curve detector 220 obtains the gamma curve of the defect by obtaining the brightness value of each grayscale, where the grayscales of the embodiment are from 0 to 255, 256 grayscales in total. The gamma-curve detector 220 obtains the gamma curve of the defect area by obtaining the brightness value of the background of the defect area at each grayscale, where the brightness value of the background of the defect area refers to the brightness value of the area in rest of the defect within the defect area. The gamma-curve detector 220 also obtains the standard gamma curve of the display panel by obtaining the brightness value of the background of the display panel measured by a standard optical measurement device (CA 310) at each grayscale.

The standard-gamma-curve detector 230 is configured to obtain the standard gamma curve of the defect and the standard gamma curve of the background of the defect area, based on the gamma curve of the defect, the gamma curve of the background of the defect area, and the standard gamma curve of the background of the display panel. In more detail, the standard-gamma-curve detector 230 obtains the brightness value of the defect and the first mapping curve of the brightness value of the background of the display panel, and the brightness value of the background of the defect area and the second mapping curve of the brightness value of the background of the display panel based on the gamma curve of the defect, the gamma curve of the background of the defect area, and the standard gamma curve of the background of the display panel; then the standard-gamma-curve detector 230 obtains the standard gamma curve of the defect and the standard gamma curve of the background of the defect area by the first mapping curve and the second mapping curve.

To further reduce the amount of calculation according to the grayscale compensation method for the defect on the display panel according to the embodiment, the compensable-defect detector 240 is configured to categorize types of the defect, for determining if the defect is a compensable defect. In more detail, the compensable-defect detector 240 determines if the brightness value corresponding to the maximum grayscale of the defect and the brightness value corresponding to the minimum grayscale of the defect meet Equation 1, and accordingly determines if the defect a compensable defect.

The compensable-defect detector 240 determines the defect as a compensable defect if the brightness value corresponding to the maximum grayscale of the defect and the brightness value corresponding to the minimum grayscale of the defect meet Equation 1.

Or if the standard gamma curve of the defect constitutes in crest or trough, the compensable-defect detector 240 determines the defect as a compensable defect.

When the compensable-defect detector 240 determines the defect as a compensable defect, the calculator 250 calculates the grayscale-compensation value for each grayscale of the defect by Equation 2, based on the standard gamma curve and the standard gamma curve of the background of the defect area.

In conclusion, it reduces the calculation substantially and achieves the best compensation to the defect on the display panel for the grayscale compensation method according to the embodiment and the system of the same.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A method of grayscale compensation to defects on a display panel, comprising:
    (A) obtaining a set of coordination of the defect on the display panel, and determining a defect area where the defect locates based on the set of coordination;
    (B) obtaining a gamma curve of the defect, a gamma curve of a background of the defect area, and a standard gamma curve of the background of the display panel;
    (C) obtaining a standard gamma curve of the defect and a standard gamma curve of the background of the defect area, based on the gamma curve of the defect, the gamma curve of the background of the defect area, and the standard gamma curve of the background of the display panel; and (D) calculating a grayscale-compensation value for each grayscale of the defect, based on the standard gamma curve and the standard gamma curve of the background of the defect area;

wherein the step (C) of obtaining a standard gamma curve of the defect and a standard gamma curve of the background of the defect area comprises:

obtaining a first mapping curve of a brightness value of the defect and a brightness value of the background of the display panel, and a second mapping curve of a brightness value of the background of the defect area and the brightness value of the background of the display panel, based on the gamma curve of the defect, the gamma curve of the background of the defect area, and the standard gamma curve of the background of the display panel; and obtaining the standard gamma curve of the defect and the standard gamma curve of the background of the defect area by the first mapping curve and the second mapping curve; and wherein before step (D), the method further comprises:

determining if the defect is a compensable defect; and wherein in case that the defect as a compensable defect, performing step (D).

2. The method of claim 1, wherein a step of determining if the defect is a compensable defect comprises: determining the defect as a compensable defect, if a brightness value corresponding to a maximum grayscale of the standard gamma curve of the defect and a minimum grayscale of the standard gamma curve of the defect meet Equation 1

$$\frac{X(\max) - X(\min)}{\max + 1} \geq T,$$ Equation 1 where max denotes to the maximum grayscale of the standard gamma curve of the defect, min to the minimum grayscale of the standard gamma curve of the defect, X(max) to the brightness value corresponding to the maximum grayscale, X(min) to the brightness value corresponding to the minimum grayscale, and T to a predetermined threshold.

3. The method of claim 1, wherein a step of determining if the defect is a compensable defect comprises: determining the defect as a compensable defect, if a brightness value corresponding to a maximum grayscale of the standard gamma curve of the defect and a minimum grayscale of the standard gamma curve of the defect meet Equation 1

$$\frac{X(\max) - X(\min)}{\max + 1} \geq T,$$ Equation 1 where max denotes to the maximum grayscale of the standard gamma curve of the defect, min to the minimum grayscale of the standard gamma curve of the defect, X(max) to the brightness value corresponding to the maximum grayscale, X(min) to the brightness value corresponding to the minimum grayscale, and T to a predetermined threshold.

4. The method of claim 1, wherein the step (D) of calculating the grayscale compensation value of each grayscale based on the standard gamma curve of the defect and the standard gamma curve of the background of the defect area, is performed by Equation 2

$$\Delta gray = gray2(L) - gray1(L),$$ Equation 2:

where gray1(L) denotes to a grayscale of the defect obtained at a particular brightness value L based on the standard gamma curve of the defect, gray2(L) to a grayscale of the background of the defect area obtained at the particular brightness value L based on the standard gamma curve of the background of the defect area, and Δgray to a grayscale compensation value of the grayscale gray1(L) of the defect.

5. A grayscale compensation system for a defect on a display panel, comprising:

a location detector, configured to obtain a set of coordination of the defect on the display panel, and to determine a defect area where the defect locates based on the set of coordination;

a gamma-curve detector, configured to obtain a gamma curve of the defect, a gamma curve of a background of the defect area, and a standard gamma curve of the background of the display panel;

a standard-gamma-curve detector, configured to obtain a standard gamma curve of the defect and a standard gamma curve of the background of the defect area, based on the gamma curve of the defect, the gamma curve of the background of the defect area, and the standard gamma curve of the background of the display panel; and a calculator, configured to calculate a grayscale-compensation value for each grayscale of the defect, based on the standard gamma curve and the standard gamma curve of the background of the defect area;

wherein the standard-gamma-curve detector is further configured to obtain a first mapping curve of a brightness value of the defect and a brightness value of the background of the display panel, and a second mapping curve of a brightness value of the background of the defect area and the brightness value of the background of the display panel, based on the gamma curve of the defect, the gamma curve of the background of the defect area, and the standard gamma curve of the background of the display panel; and to obtain the standard gamma curve of the defect and the standard gamma curve of the background of the defect area by the first mapping curve and the second mapping curve; and a compensable-defect detector, configured to determine if the defect is a compensable defect.

6. The grayscale compensation system of claim 5, wherein the compensable-defect detector further configured to determine the defect as a compensable defect if a brightness value corresponding to a maximum grayscale of the standard gamma curve of the defect and a minimum grayscale of the standard gamma curve of the defect meet Equation 1

$$\frac{X(\max) - X(\min)}{\max + 1} \geq T,$$ Equation 1 where max denotes to the maximum grayscale of the standard gamma curve of the defect, min to the minimum grayscale of the standard gamma curve of the defect, X(max) to the brightness value corresponding to the maximum grayscale, X(min) to the brightness value corresponding to the minimum grayscale, and T to a predetermined threshold.

7. The grayscale compensation system of claim 5, wherein the compensable-defect detector further configured to determine the defect as a compensable defect if a brightness value corresponding to a maximum grayscale of the standard gamma curve of the defect and a minimum grayscale of the standard gamma curve of the defect meet Equation 1

$$\frac{X(\max) - X(\min)}{\max + 1} \geq T,  \quad \text{Equation 1}$$

where max denotes to the maximum grayscale of the standard gamma curve of the defect, min to the minimum grayscale of the standard gamma curve of the defect, X(max) to the brightness value corresponding to the maximum grayscale, X(min) to the brightness value corresponding to the minimum grayscale, and T to a predetermined threshold.

8. The grayscale compensation system of claim 5, wherein the calculator further configured to calculate out the grayscale compensation value of each grayscale, based on the standard gamma curve of the defect and the standard gamma curve of the background of the defect area, by Equation 2

$$\Delta\text{gray} = \text{gray2}(L) - \text{gray1}(L), \quad \text{Equation 2:}$$

where gray1(L) denotes to a grayscale of the defect obtained at a particular brightness value L based on the standard gamma curve of the defect, gray2(L) to a grayscale of the background of the defect area obtained at the particular brightness value L based on the standard gamma curve of the background of the defect area, and Δgray to a grayscale compensation value of the grayscale gray1(L) of the defect.

9. The grayscale compensation system of claim 5, wherein in case that the compensable-defect determining unit determines the defect as a compensable defect, the calculating unit calculates out the grayscale-compensation value for each grayscale of the compensable defect based on the standard gamma curve of the compensable defect and the standard gamma curve of the background of the defect area wherein the compensable defect located.

* * * * *